C. J. JOHNSON.
MACHINE FOR MAKING TUBING.
APPLICATION FILED DEC. 17, 1909.
1,129,398.
Patented Feb. 23, 1915.
2 SHEETS—SHEET 1.
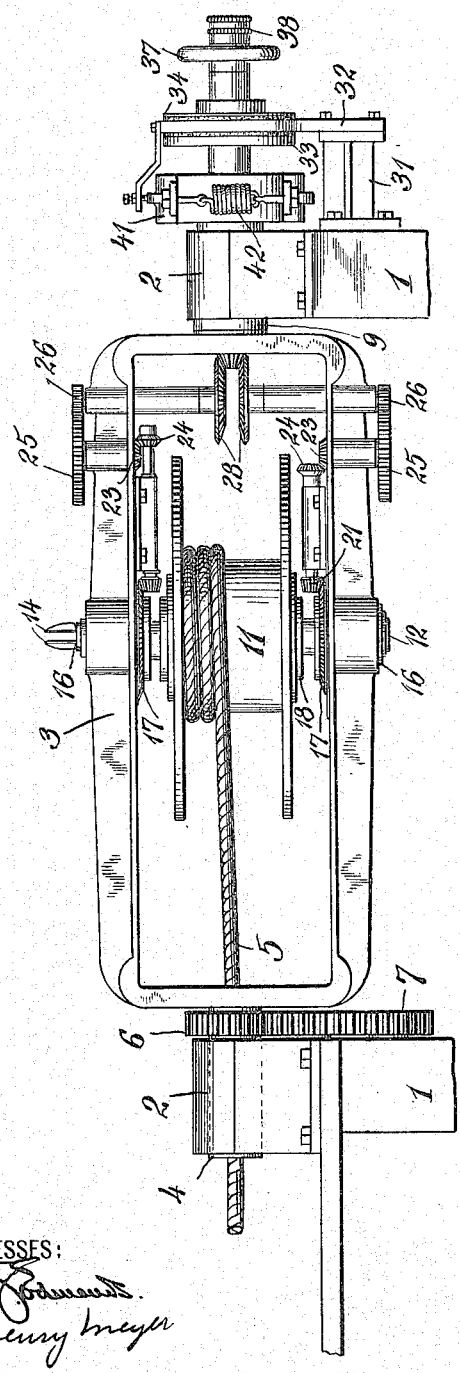
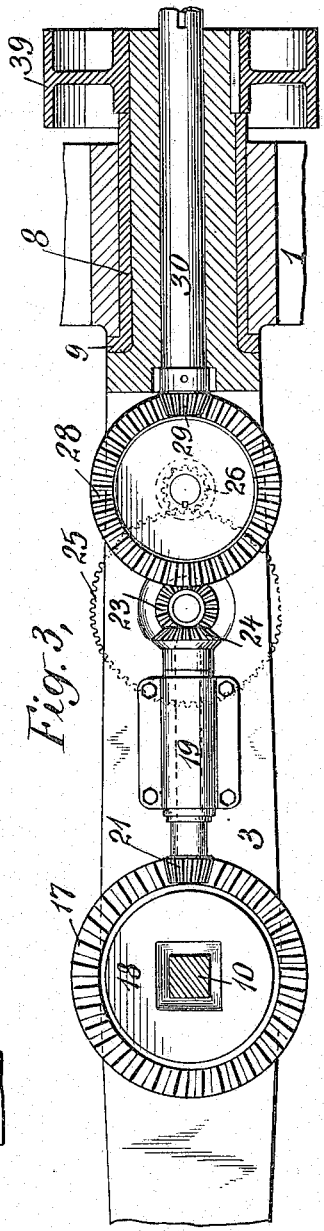
WITNESSES:
INVENTOR
Charles J. Johnson
BY
ATTORNEY

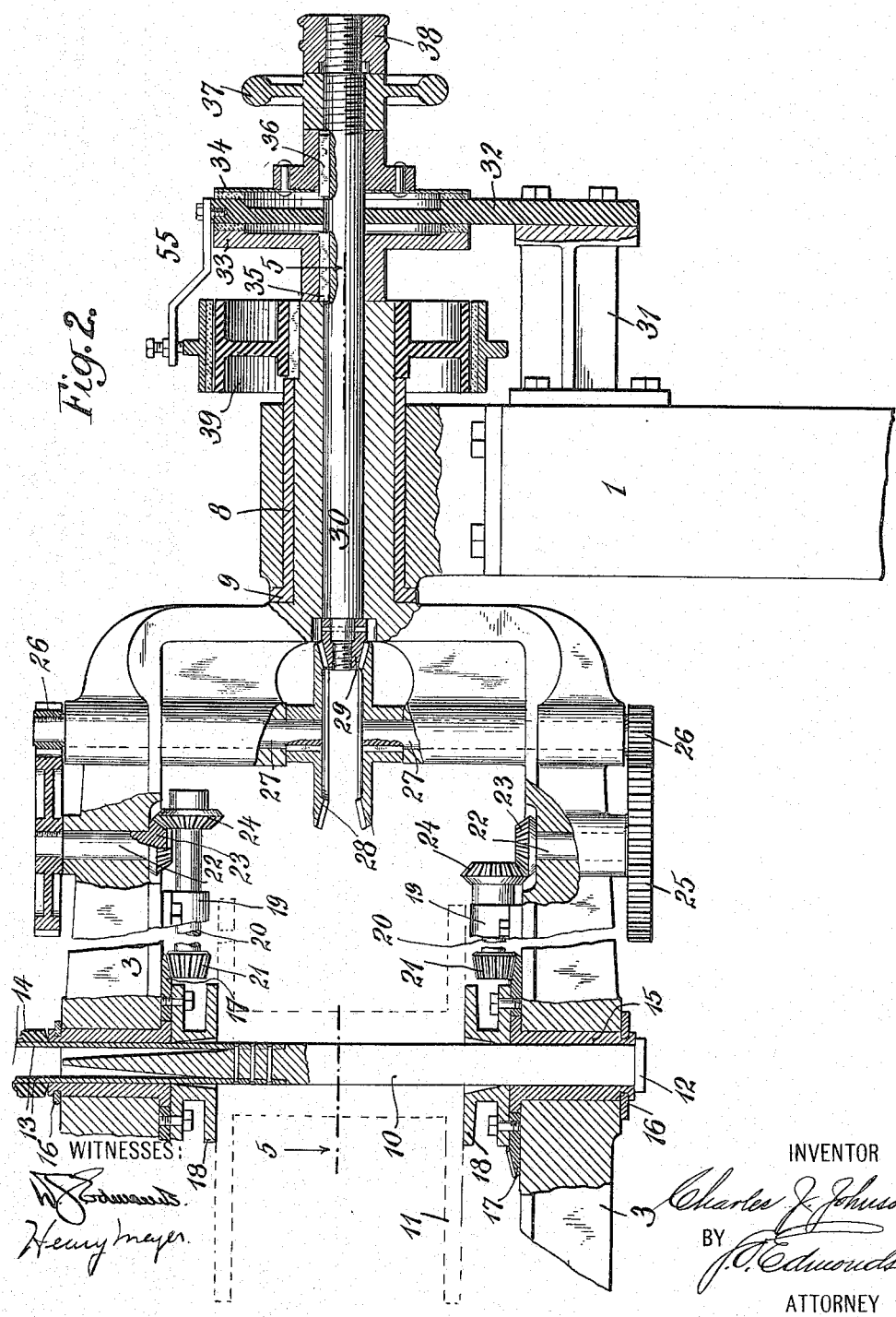

UNITED STATES PATENT OFFICE.

CHARLES J. JOHNSON, OF BLOOMFIELD, NEW JERSEY, ASSIGNOR, BY MESNE ASSIGNMENTS, TO GENERAL ELECTRIC COMPANY, A CORPORATION OF NEW YORK.

MACHINE FOR MAKING TUBING.

1,129,398.   Specification of Letters Patent.   Patented Feb. 23, 1915.

Application filed December 17, 1909. Serial No. 533,585.

*To all whom it may concern:*

Be it known that I, CHARLES J. JOHNSON, a citizen of the United States, residing at Bloomfield, in the county of Essex and State of New Jersey, have invented certain new and useful Improvements in Machines for Making Tubing, of which the following is a specification.

This invention relates to machines for use in manufacturing tubing by winding strip material spirally so as to form a series of convolutions. Such tubing is widely used as conduit or armoring for electric conductors and for this purpose is usually made from long strips of sheet steel which are first curved transversely and then wound spirally so as to form a series of spirals, each convolution interlocking with and movable relatively to the spirals adjacent thereto.

My present invention relates to machines for making tubing of this character and more particularly to machines of the type described in Patent No. 838,179, dated December 11, 1906.

The invention is directed to the provision of an improved form of supporting and actuating mechanism for the reel upon which the completed tubing is wound and includes automatic mechanism for turning the reel as may be required in order to wind the tubing properly thereon and to hold taut the length of tubing extending from the reel to the forming devices.

In machines of this character, the reel upon which the finished tubing is wound must be supported upon a frame which is adapted to rotate in accordance with the operation of manufacturing the tubing, that is in accordance with the operation of winding the strip into a tube. While the frame carrying the reel is thus rotated, the reel itself must be rotated on its axis in order to wind the tubing thereon and such rotation of the reel must vary with respect to the rotation of the frame throughout the operation of manufacturing the tubing, for the reason that as the operation progresses, a less rotation of the reel is required to wind a given amount of tubing thereon.

In accordance with the invention, the rotation of the frame carrying the reel is utilized to cause the rotation of the reel within the frame, and for this purpose gearing is employed, one of the members of which is carried by a floating shaft which will remain stationary or turn more or less as may be required automatically to give the requisite rotation of the reel. This floating shaft is acted upon by a suitable friction brake, preferably adjustable, which insures that the tubing will be wound with the desired tightness upon the reel.

I have illustrated the preferred embodiment of my invention in the accompanying drawings in which—

Figure 1 is a side elevation of the machine, Fig. 2 is a longitudinal vertical section of the same, and Fig. 3 is a section on line 5—5 of Fig. 2.

Referring to these drawings, 1, 1 indicate standards carrying bearings 2 in which the frame 3 is mounted for rotation. The standard at the left may be part of the frame carrying the forming devices which are located adjacent to the frame 3 and preferably as shown in the patent above referred to. The frame 3 has hollow trunnions at opposite ends thereof which are received in the bearings formed in the standards 1, 1. The trunnion 4 at the left end of the machine forms a passage-way for the tubing 5 and on this trunnion is a pinion 6 meshing with a gear 7 by which rotary motion is transmitted to the frame 3 about the axis of the trunnions. At the opposite side of the machine, the trunnion 8 extends through the bearing in the standard 1, the latter being provided with a suitable bushing 9. In the side members of the frame 3 are formed openings adapted to receive a shaft 10 which supports the reel 11 on which the tubing 5 is wound. The shaft 10 has a head 12 at one end thereof and at the opposite end is tapered off as shown in Fig. 2. To this end of shaft 10 are secured two leaf springs 13 disposed in continuation of the flattened surfaces of the shaft. Each of these springs 13 has secured to its end a block 14. It will be apparent that by pressing the two blocks 14 together the shaft 10 may be readily withdrawn from its openings in the frame 3 in order to release the reel 11 thereon; also when mounting a reel upon the frame it is only necessary to pass the end of shaft 10 through its bearings until the blocks 14 spring outwardly into the position in which they are shown in Fig. 2 whereupon these blocks will hold shaft 10 in position against the centrifugal force to which it is subjected during the operation of the machine. The shaft 10 is of polygonal cross-section, as shown in Fig. 3, so that when rotated the reel thereon will be rotated with it.

The ends of shaft 10 are received in sleeves 15 adapted to rotate in the bearings formed in the frame 3, these sleeves being positioned by collars 16 secured thereto. On each sleeve 15 is a bevel gear 17 having collars 18 secured thereto and lying with their adjacent faces abutting the faces of the reel 11. The side members of the frame 3 have bearings 19 formed thereon in which shafts 20 are rotatable and each of these shafts carries a bevel gear 21 meshing with the adjacent bevel gear 17. In the side members of the frame 3 are transverse openings forming bearings for short shafts 22 each having a bevel gear 23 on its inner end meshing with a bevel gear 24 secured to the shaft 20. The bevel gear 24 on one side of the machine lies on one side of the axis of the shafts 22 while that on the other side of the frame lies on the opposite side of said axis. The shafts 22 carry gears 25 on their outer ends meshing with pinions 26 secured to shafts 27 which are rotatable in bearings formed in frame 3. Each of these shafts 27 carries a bevel gear 28, the two bevel gears lying face to face and meshing with a pinion 29, disposed between them and rotatable on the same axis as that about which the frame 3 is rotatable. The gear 29 is secured to a shaft 30 extending through the hollow trunnion 8 of the frame 3. This shaft 30 is a floating shaft in that at times it may remain stationary while at other times it rotates with varying speed as may be required.

Secured to the standard 1 is an arm 31 having secured thereto a brake member 32. Two braking members 33 and 34 coact with this member 32 these being disposed on either side of the member 32. The brake member 33 is secured to shaft 30 by means of a key 35. The brake member 34 is splined to the shaft 30 by means of a spline 36. One end of the shaft 30 is threaded, as shown in Fig. 2, and on this threaded end is a hand wheel 37 which may be turned more or less to force the brake member 34 against the brake member 32 and the latter may have a slight amount of flexibility so that when the member 34 presses thereon it may be forced into harder engagement with the brake-member 33. In the rear of hand wheel 37 is a lock-nut 38 threaded on the end of the shaft 30, adapted to hold the hand-wheel 37 in any position to which it is moved.

During the operation of the machine to make spiral tubing, the frame 3 will be rotated, thus rotating the reel 11 in accordance with the rate at which the convolutions of the tubing are wound. If during the rotation of the frame 3, the shaft 30 remains stationary, the gear 29 thereon will cause rotation of the gears 28 and these will act through the gearing connecting them with the shaft 10, to cause rotation of reel 11 and thus wind the tubing upon the reel. It will be apparent that at the beginning of the operation the reel 11 must be rotated more rapidly than after several layers of the tubing have been wound upon the reel and also that the driving mechanism of the reel will exert such a pull thereon as will hold taut the length of tubing extending from the tube-forming devices to the reel. The brake for the reel driving devices consisting of brake members 32, 33, 34 will continue to hold the shaft 30 stationary but as the tubing is wound upon the reel the shaft 30 will be rotated more or less by the rotation of the gears 28 carried by the frame 3 and when the shaft 30 rotates so it will cause a less actuation of the reel 11, but will exert the proper tension upon the tubing leading to the reel. If at any time it be found that the tubing extending from the forming-devices to the reel is drawn too tightly or not tightly enough, the braking effect of the members 32, 33 and 34 upon the shaft 30 may be regulated as required by turning hand-wheel 37 and when the proper position of the hand-wheel is found it may be locked in this position by the nut 38.

Having described my invention what I claim as new therein and desire to secure by Letters Patent of the United States is:

1. In a machine for making spiral tubing, the combination of a rotatable frame, a rotatable reel carried thereby on which the tubing is wound, means for rotating the reel at a variable speed as the frame is rotated, comprising a rotatable floating shaft geared to said reel, a stationarily mounted braking member, a brake member mounted on said shaft to rotate therewith and be movable axially thereon, adapted to coact with said first braking member, a hand-wheel threaded on said shaft, adapted to be moved to regulate the pressure between said braking members and a nut adapted to lock said hand-wheel in adjusted position, whereby the same may be used as a handle for rotating said shaft manually when said hand-wheel has been so locked, substantially as set forth.

2. In a machine for making spiral tubing the combination of a rotatable frame, a rotatable reel carried thereby, on which the tubing is wound, means for rotating the reel at a variable speed as the frame is rotated comprising a gear concentric with the frame, gearing connecting said gear with the reel, a shaft on which the gear is mounted, a brake-member on said shaft, and a stationarily mounted brake-member coacting with said brake-member, said shaft extending beyond said brake-members and having a handle applied thereto for manual operation of the shaft and also adapted to adjust the pressure between said brake members, substantially as set forth.

3. In a machine for making spiral tubing, the combination of a rotatable frame, a rotatable reel carried thereby on which the tubing is wound, means for rotating the reel at a variable speed as the frame is rotated comprising a gear concentric with the frame, gearing connecting said gear with the reel, a floating shaft on which the gear is mounted, means for braking the rotation of said shaft, and hand-operated means mounted on said shaft, adapted to be moved thereon to adjust the pressure of said braking means and also to serve as a handle for rotating said shaft manually, substantially as set forth.

This specification signed and witnessed this 11th day of December, 1909.

CHAS. J. JOHNSON.

Witnesses:
H. F. COSGROVE,
HENRY MEYER.

Copies of this patent may be obtained for five cents each, by addressing the "Commissioner of Patents, Washington, D. C."